United States Patent
Kim (10) Patent No.: US 8,306,376 B2
(45) Date of Patent: Nov. 6, 2012

(54) METHOD AND APPARATUS FOR MULTIPLEXING OPTICAL INFORMATION FOR RECORDING AND REPRODUCING OPTICAL INFORMATION OVER OPTICAL STORAGE MEDIUM

(75) Inventor: Kun-Yul Kim, Gunpo-si (KR)

(73) Assignee: Wi-LAN Inc., Ottawa (CA)

( * ) Notice: Subject to any disclaimer, the term of this patent is extended or adjusted under 35 U.S.C. 154(b) by 0 days.

(21) Appl. No.: 11/486,451

(22) Filed: Jul. 12, 2006

(65) Prior Publication Data

US 2007/0147735 A1  Jun. 28, 2007

(30) Foreign Application Priority Data

Dec. 22, 2005 (KR) .................. 10-2005-0127443

(51) Int. Cl.
*G02B 6/34* (2006.01)

(52) U.S. Cl. ................ 385/37; 359/15; 359/17; 359/18; 359/558; 359/573; 369/103

(58) Field of Classification Search .............. 385/37; 359/24, 15, 17, 18, 558, 566, 573; 369/103
See application file for complete search history.

(56) References Cited

U.S. PATENT DOCUMENTS

| | | | |
|---|---|---|---|
| 4,104,489 A | 8/1978 | Satoh et al. | |
| 4,550,395 A | 10/1985 | Carlson | |
| 4,712,852 A * | 12/1987 | Funato et al. ................ | 359/18 |
| 5,044,718 A * | 9/1991 | Kando ........................ | 385/4 |
| 5,550,779 A | 8/1996 | Burr et al. | |
| 5,568,574 A * | 10/1996 | Tanguay et al. .............. | 385/14 |
| 5,621,527 A * | 4/1997 | Kaneda et al. ............... | 356/499 |
| 5,680,232 A * | 10/1997 | Iwamatsu et al. ............ | 359/18 |
| 5,680,253 A * | 10/1997 | Hasegawa et al. ............ | 359/566 |
| 5,861,964 A * | 1/1999 | Hasegawa et al. ............ | 359/18 |
| 5,930,219 A | 7/1999 | Kim | |
| 5,959,747 A | 9/1999 | Psaltis et al. | |
| 5,978,111 A * | 11/1999 | Hasegawa et al. ............ | 359/18 |
| 6,020,984 A | 2/2000 | Hasegawa et al. | |
| 6,322,933 B1 | 11/2001 | Daiber et al. | |
| 6,801,348 B2 * | 10/2004 | Ramapujam et al. ......... | 359/34 |
| 6,898,348 B2 * | 5/2005 | Morozov et al. .............. | 385/37 |
| 7,023,562 B2 * | 4/2006 | De Lega ...................... | 356/521 |
| 7,160,673 B2 * | 1/2007 | Menon et al. ................ | 430/321 |
| 2003/0026542 A1 * | 2/2003 | Yoshikawa et al. ........... | 385/37 |
| 2003/0190121 A1 | 10/2003 | Luo et al. | |
| 2004/0132205 A1 * | 7/2004 | Moon et al. .................. | 436/174 |
| 2004/0135100 A1 | 7/2004 | Menon et al. | |
| 2005/0002311 A1 * | 1/2005 | Ichihara et al. .............. | 369/103 |
| 2005/0038663 A1 * | 2/2005 | Brotz ........................... | 704/277 |
| 2005/0249095 A1 * | 11/2005 | Tanaka et al. ................ | 369/103 |
| 2005/0270603 A1 * | 12/2005 | Putnam et al. ................ | 359/2 |
| 2006/0072177 A1 * | 4/2006 | Putnam et al. ................ | 359/2 |
| 2006/0109535 A1 * | 5/2006 | Kuroda et al. ................ | 359/24 |
| 2006/0262701 A1 * | 11/2006 | Okada et al. ................. | 369/103 |

FOREIGN PATENT DOCUMENTS

| | | |
|---|---|---|
| EP | 0020076 A1 | 10/1980 |
| EP | 1507178 A1 | 2/2005 |
| KR | 10-1995-0067352 | 12/1995 |
| KR | 1020050102748 | 10/2005 |
| WO | 9701133 A1 | 9/1997 |
| WO | WO03049091 | 6/2003 |
| WO | WO03094157 | 11/2003 |

* cited by examiner

*Primary Examiner* — Ellen Kim (74) *Attorney, Agent, or Firm* — Venable LLP; Robert S. Babayi (57) ABSTRACT

There is provided an optical multiplexer including: a substrate having a plurality of beam transmitting portions; and diffraction gratings diffracting beams irradiated to the beam transmitting portions at different angles, each diffraction grating being formed in the corresponding beam transmitting portion. Accordingly, it is possible to reduce an alignment error and manufacturing cost and to reduce the entire size of a recording apparatus or a reproducing apparatus.

15 Claims, 11 Drawing Sheets

METHOD AND APPARATUS FOR MULTIPLEXING OPTICAL INFORMATION FOR RECORDING AND REPRODUCING OPTICAL INFORMATION OVER OPTICAL STORAGE MEDIUM

BACKGROUND

1. Technical Field

The present invention relates to an optical information multiplexing and processing apparatus, and more particularly, to an optical multiplexer for multiplexing a beam by the use of a diffraction grating and a manufacturing method thereof, optical information recording apparatus and method using the optical multiplexer, and optical information reproducing apparatus and method using the optical multiplexer.

2. Related Art

Examples of an optical data processing apparatuses can include a digital versatile disc (DVD), a high definition DVD (HD-DVD), a blue-ray disc (BD), a near-field optical information processing apparatus, and a holographic optical information processing apparatus.

The holographic optical information processing apparatus stores data in a storage medium by irradiating an optically modulated signal beam and a reference beam to the storage medium. Here, the reference beam forms an interference fringe in the storage medium through intersection with the signal beam. The holographic optical information processing apparatus reproduces data by irradiating the reference beam to the interference fringe of the storage medium and outputting the data stored in the storage medium through diffraction resulting from the interference fringe.

The holographic optical information processing apparatus can store data in a multiplexing manner by irradiating the reference beam to one beam spot at different angles, thereby enhancing the recording capacity of the storage medium. The multiplexed recorded data can be output by irradiating the reference beam at different angles at the time of reproducing the data. That is, the holographic optical information processing apparatus is an ultra-high-capacity data processing apparatus which can input data to and output data from one beam spot with the data superposed in multi layers.

The optical information processing apparatus such as the holographic optical information processing apparatus employs a device or a method for multiplexing a beam. Examples of the beam multiplexing method include an angular multiplexing method, a phase-code multiplexing method, and a wavelength multiplexing method. In the angular multiplexing method, a multiplexing operation is performed by changing an incident angle of a reference beam. In the phase-code multiplexing method, a multiplexing operation is performed by spatially modulating a phase. In the wavelength multiplexing method, a multiplexing operation is performed by wavelengths by the use of a variable wavelength laser.

A known technique of the beam multiplexing method is disclosed in Korean Unexamined Patent Publication No. 2005-0102748, entitled "Holographic Information Recording/Reproducing Apparatus." As disclosed in the Korean unexamined patent publication, two or more multiplexing methods can be used in parallel to store holographic optical information. A typical complex multiplexing method combines an in-plane multiplexing method and an out-of-plane multiplexing method. However, the known complex multiplexing method disclosed in the Korean unexamined patent publication generally requires complex configuration and control system such as a plurality of rotating mirrors, thereby increasing the size of the apparatus.

In the improved complex multiplexing method disclosed in the Korean unexamined patent publication, two wedge prisms are superposed for use and the complex multiplexing operation is performed by rotating a storage medium. For this purpose, the wedge prisms are moved in a rotating direction and an optical axis direction by an additional control system. According to the Korean unexamined patent publication, it is disclosed that the total size of the optical system can be further reduced, compared with the complex multiplexing operation using two rotating mirrors in an additional space. However, since the wedge prisms should be rotating or moved, the optical control for multiplexing should be performed twice and two wedge prisms having relatively high price should be used.

SUMMARY

An object of the invention is to provide an optical multiplexer using a diffraction grating and a method of manufacturing the optical multiplexer. Another object of the invention is to provide optical information recording apparatus and method for multiplexing and recording optical information using an optical multiplexer having a diffraction grating therein, and optical information reproducing apparatus and method using the optical multiplexer.

According to an aspect of the invention, there is provided an optical multiplexer comprising: a substrate having a plurality of beam transmitting portions; and diffraction gratings diffracting beams irradiated to the beam transmitting portions at different angles, each diffraction grating being formed in the corresponding beam transmitting portion.

According to another aspect of the invention, there is provided a method of manufacturing an optical multiplexer, the method comprising: irradiating a second beam at a first angle along with a first beam to a first beam transmitting photo-reactant to form a first diffraction grating in the first beam transmitting photo-reactant; and irradiating the second beam at a second angle different from the first angle along with the first beam to a second beam transmitting photo-reactant to form a second diffraction grating.

According to another aspect of the invention, there is provided an optical information recording apparatus comprising: a light source; a beam splitter splitting a beam emitted from the light source; a signal beam optical system loading data to a beam split by the beam splitter and producing a signal beam; a reference beam optical system guiding another beam split by the beam splitter as a reference beam to an optical information storage medium; and an optical multiplexer multiplexing the reference beam at an angle in a plane and an angle out of the plane and guiding the multiplexed beams to the optical information storage medium.

According to another aspect of the invention, there is provided an optical information recording method comprising: splitting a beam irradiated from a light source to two beams, using one split beam as a reference beam, and loading data to the other split beam to generate a signal beam; multiplexing the reference beam at a plurality of angles by the use of a diffraction grating, by irradiating the reference beam to a beam transmitting portion in which the diffraction grating is formed and moving the beam transmitting portion; and recording the data in an optical information storage medium by irradiating the multiplexed reference beam and the signal beam to the optical information storage medium.

According to another aspect of the invention, there is provided an optical information reproducing apparatus comprising: a light source; an optical system guiding a beam emitted from the light source to an optical information storage medium which stores multiplexed optical information; an optical multiplexer multiplexing the beam at an angle in a predetermined plane and an angle out of the plane and then guiding the multiplexed beam to the optical information storage medium; and an optical information detector detecting the optical information reproduced from the optical information storage medium by the multiplexed beam.

According to another aspect of the invention, there is provided an optical information reproducing method comprising: generating a beam by irradiating a beam to a beam transmitting portion having a diffraction grating and generating the beam with a different angle from the diffraction grating by revolving the beam transmitting portion; irradiating the generated beams to an optical information storage medium in which optical information is stored and reproducing the optical information stored in the optical information storage medium by incident angles of the beams; and detecting the reproduced optical information.

BRIEF DESCRIPTION OF THE DRAWINGS

The above and other features and advantages of the present invention will become more apparent by describing in detail exemplary embodiments thereof with reference to the attached drawings in which.

DESCRIPTION OF EXEMPLARY EMBODIMENTS

Hereinafter, exemplary embodiments of the present invention will be described with reference to the attached drawings.

Embodiments of an optical multiplexer, an optical information reproducing apparatus using the optical multiplexer, and an optical information recording apparatus using the optical multiplexer are separately described. The optical multiplexer according to the invention serves to variously change an incident beam in plane or out of plane.

Optical Multiplexer

Figure 1:
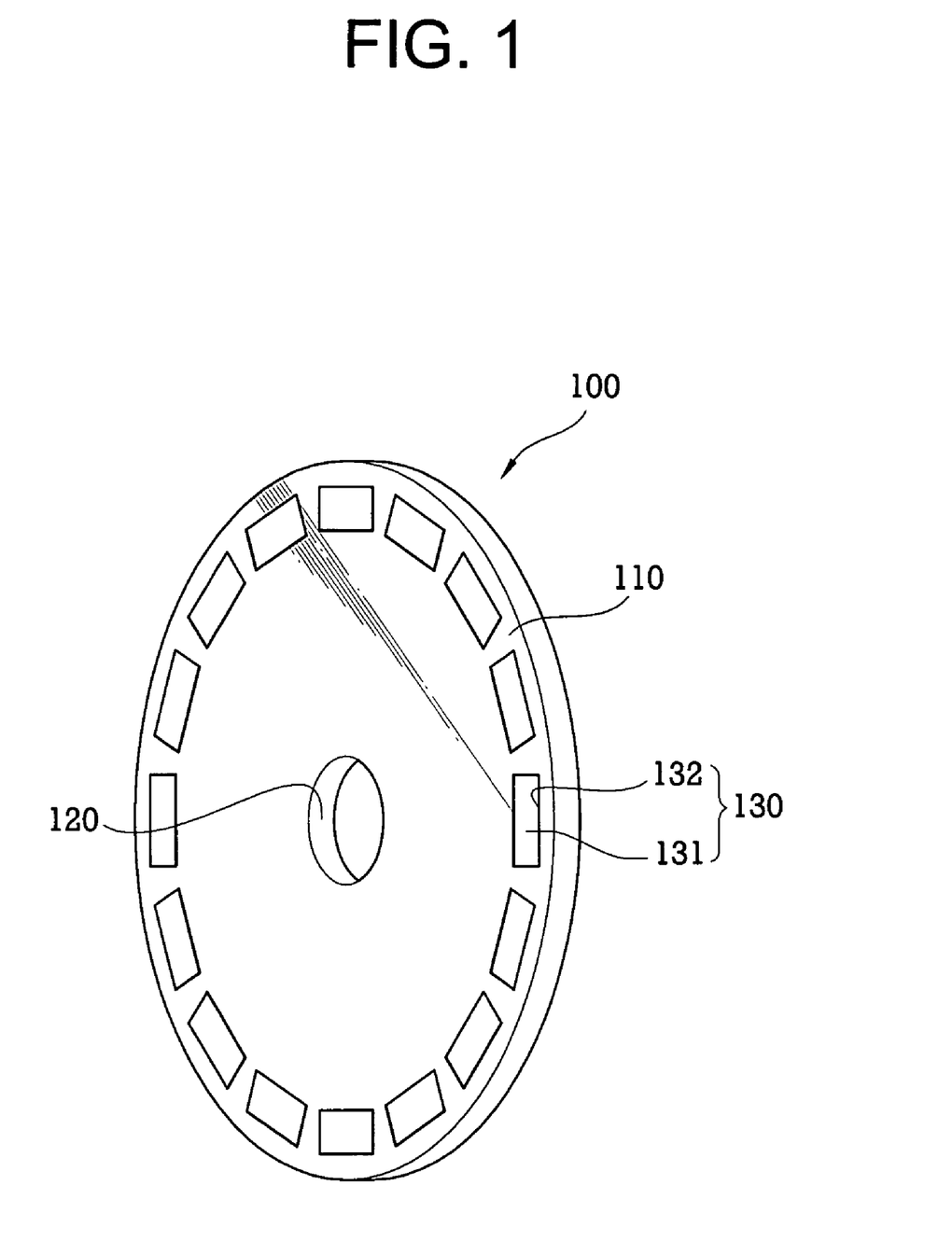
FIG. 1 is a perspective view illustrating an optical multiplexer according to an exemplary embodiment of the invention.
Figure 2:
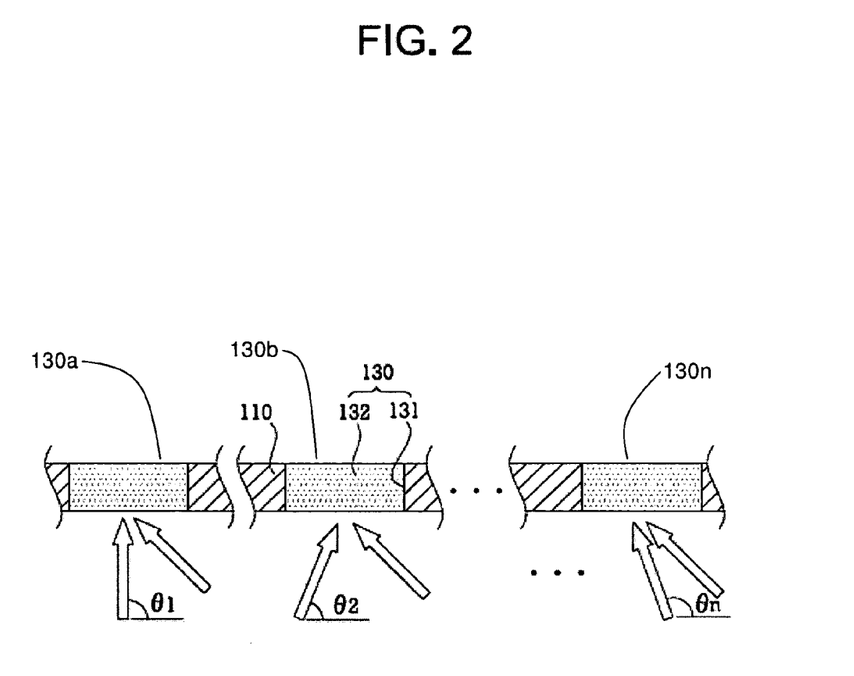
FIG. 2 is a partially expanded cross-sectional view illustrating beam transmitting portions of the optical multiplexer according to the exemplary embodiment of the invention.

FIG. 1 is a perspective view illustrating an optical multiplexer according to an exemplary embodiment of the invention and FIG. 2 is a partially expanded cross-sectional view illustrating beam transmitting portions of the optical multiplexer according to the exemplary embodiment of the invention. As shown in FIGS. 1 and 2, the optical multiplexer 100 according to the exemplary embodiment of the invention includes a substrate 110 having a circular disc shape. The shape of the substrate 110 is not limited to the disc shape, but may have a variety of shapes. A coupling hole 120 is formed at the center of the substrate 110. the coupling hole 120 is coupled to a servo motor (not shown) supplying a rotary power to the substrate 110. Accordingly, the substrate 110 is revolved by the servo motor. The substrate 110 may be made of a material reflecting and/or absorbing light.

A plurality of beam transmitting portions 130 such as a first beam transmitting portion 130a, a second beam transmitting portion 130b, . . . , and a n-th beam transmitting portion 130n (where n is the number of beam transmitting portions) arranged with a constant interval is formed around the substrate 110. In the exemplary embodiment, the beam transmitting portions 130 have a rectangular shape, but may have an arc shape, a circular shape, or an elliptical shape. The beam transmitting portions 130 are disposed preferably along the circumference of the substrate 110.

Each beam transmitting portion 130 includes a through-hole 131 penetrating the substrate 110 and a beam transmitting photo-reactant filled in the through-hole 131. A plurality of diffraction gratings is formed in the beam transmitting photo-reactant. The diffraction gratings are holographic interference fringes formed by means of irradiation of a spherical-wave beam and a plane-wave beam. A photo-polymer 132 can be used as the beam transmitting photo-reactant. An example of the photo-polymer 132 can include "HRR-660" and "OmniDex-760" (product codes) made by Dupont Co., "ULSH-500" (product code) made by Aprils Co., and polymethylmethacrylate (PMMA). Ferroelectric crystals can be used as the photo-polymer 132.

A plurality of beam transmitting portions 130 is provided as described above. The number of beam transmitting portions 130 may correspond to the number of angles in plane to be multiplexed. The first beam transmitting portion 130a of the beam transmitting portions 130 is designed to perform a multiplexing operation with an angle "θ1", the second beam transmitting portion 130b is designed to perform a multiplexing operation with an angle "θ2", and the n-th beam transmitting portion 130n is designed to perform a multiplexing operation with an angle "θn." Here, n indicates the final beam transmitting portion 130 as described above. The respective beam transmitting portions 130 converts an incident beam into a beam with a predetermined angle. The angles of the beams emitted from the beam transmitting portions 130 are different from each other.

Accordingly, by moving the substrate 110 and changing a target beam transmitting portion to which the beam is irradiated, the multiplexing of the beam is performed. Here, the multiplexing operation is an in-plane multiplexing operation with an angle changed in a two-dimensional plane. In the exemplary embodiment, a complex multiplexing operation including an in-plane multiplexing operation and an out-of-plane multiplexing operation is performed. The out-of-plane multiplexing operation can be performed by controlling the positions of the beam transmitting portions 130 without adding another element to the optical multiplexer according to the exemplary embodiment.

Figure 3A:
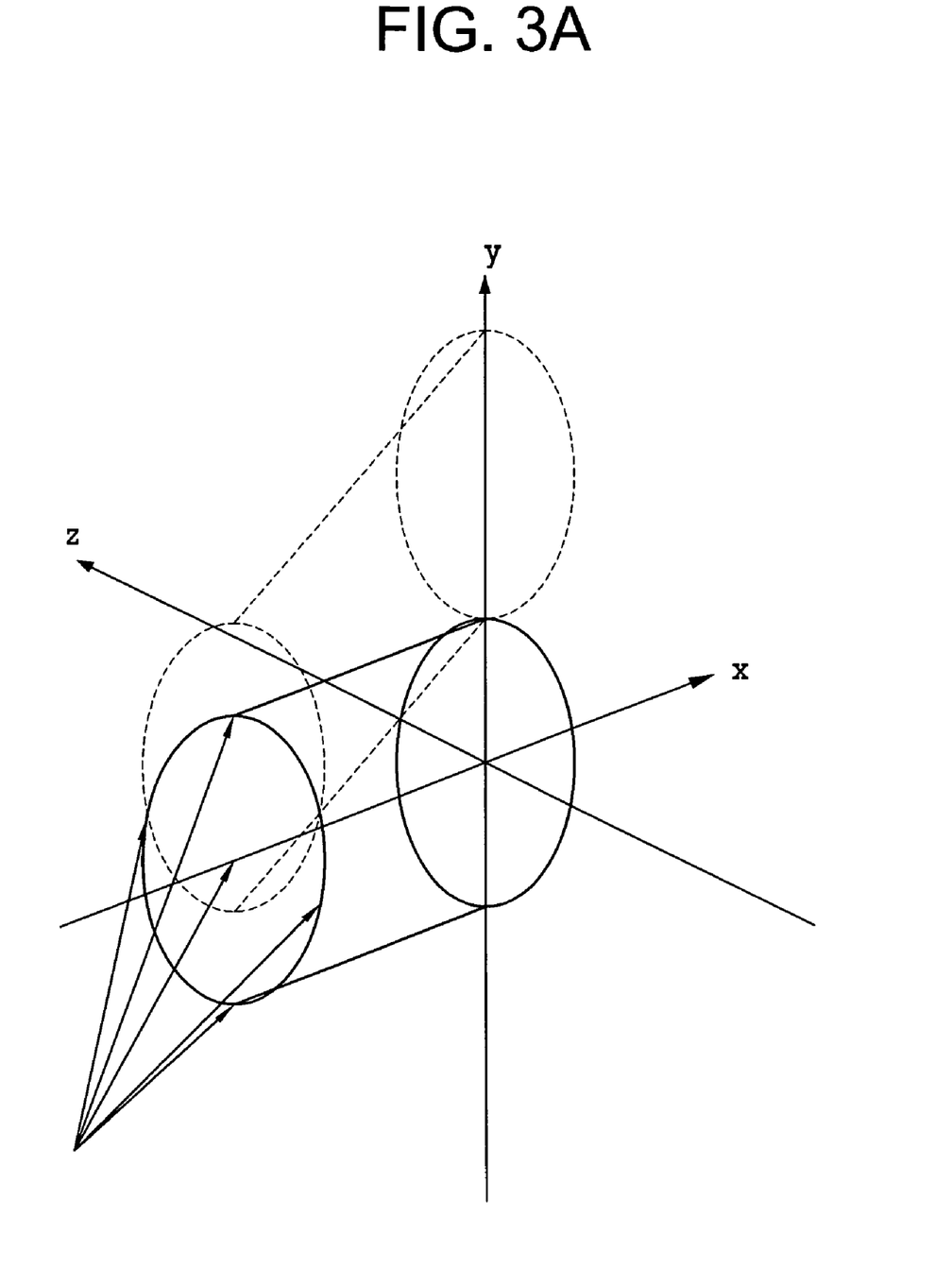
FIGS. 3A and 3B are diagrams illustrating an out-of-plane multiplexing operation of the optical multiplexer according to the exemplary embodiment of the invention.
Figure 3B:
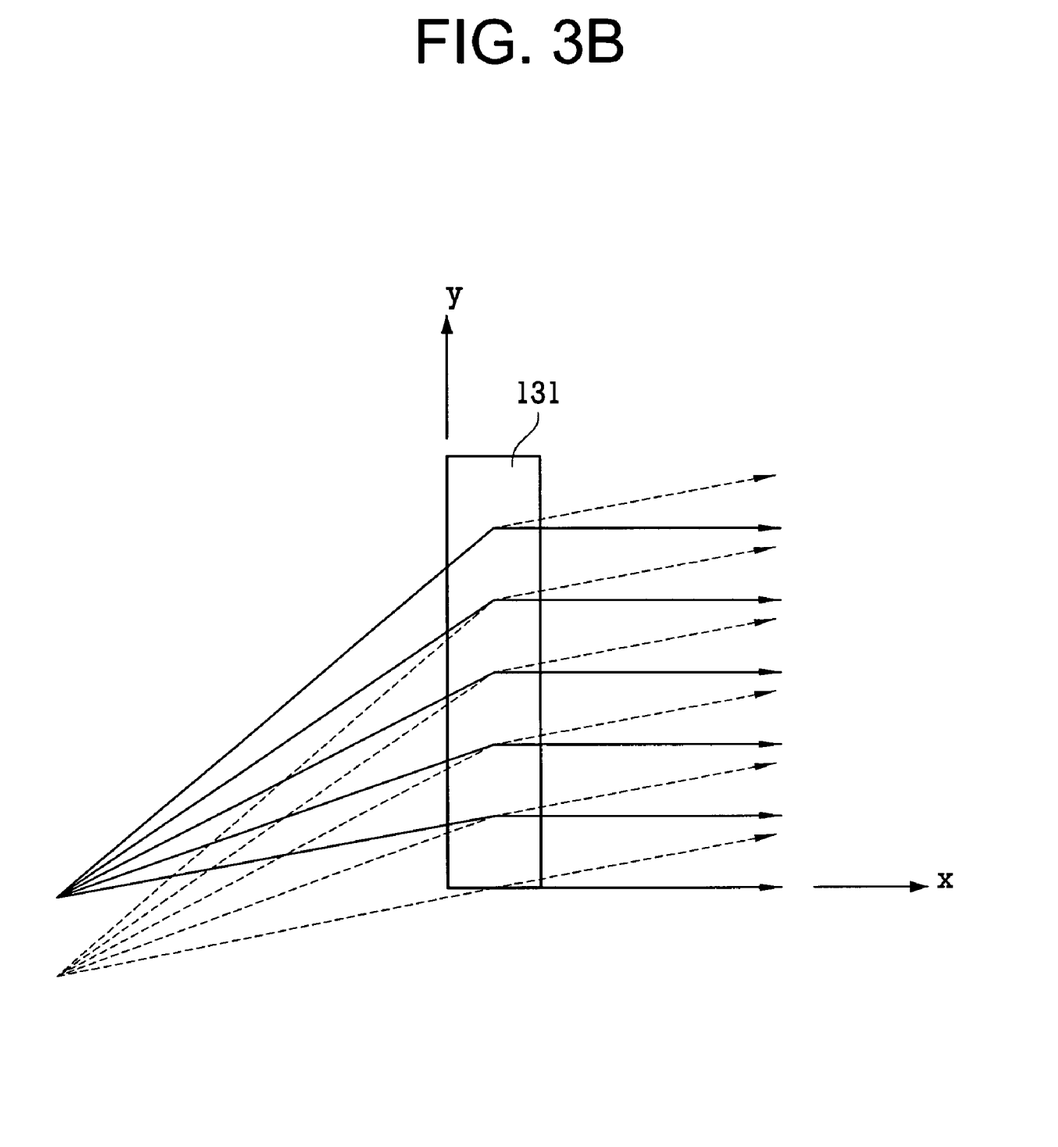

FIGS. 3A and 3B are diagrams illustrating the out-of-plane multiplexing operation of the optical multiplexer according to the exemplary embodiment of the invention. As shown in FIGS. 3A and 3B, the beam irradiated to the beam transmitting portion 130 of the optical multiplexer 100 is a spherical-wave beam having the same wavelength as the beam irradiated thereto at the time of forming the diffraction grating. Accordingly, the diffraction grating is formed as an interference fringe resulting from interference of the spherical-wave beam and the plane-wave beam. When the incident position of the spherical-wave beam irradiated to the beam transmitting portion 130 is changed, the beam transmitting portion 130 converts the irradiated beam into a beam with a different angle out of the plane in the Y axis direction. By changing the position of the photo-polymer 132 of the beam transmitting portion 130 out of the plane, an out-of-plane multiplexed beam corresponding to the changed position is generated from the beam transmitting portion 130.

In the exemplary embodiment of the invention, the position of a spherical-wave light source is not changed for the out-of-plane multiplexing operation. Even when the position of the spherical-wave light source is changed, the technical spirit of the invention can be accomplished. However, it is possible to enhance multiplexing efficiency by revolving the substrate 110. That is, in the optical multiplexer 100 according to the exemplary embodiment of the invention, the substrate 110 is revolved for the out-of-plane multiplexing operation. Incidentally, as shown in FIG. 3B, when the substrate 110 is moved upward without departing from a predetermined range of position of the optical transmitting portion 130 to which the spherical-wave beam is irradiated, the beam emitted from the diffraction grating has a different angle. Accordingly, a beam having a different out-of-plane angle is generated from the same beam transmitting portion 130 (see FIG. 3B).

In the optical multiplexer 100 according to the exemplary embodiment of the invention, the spherical-wave beam is irradiated to the beam transmitting portions 130 for the in-plane multiplexing operation, and the spherical-wave beam is irradiated to each beam transmitting portion while slightly changing the position of the corresponding beam transmitting portion for the out-of-plane multiplexing operation.

Now, a method of manufacturing the optical multiplexer according to the exemplary embodiment of the invention having the above-mentioned configuration will be described.

Figure 4:
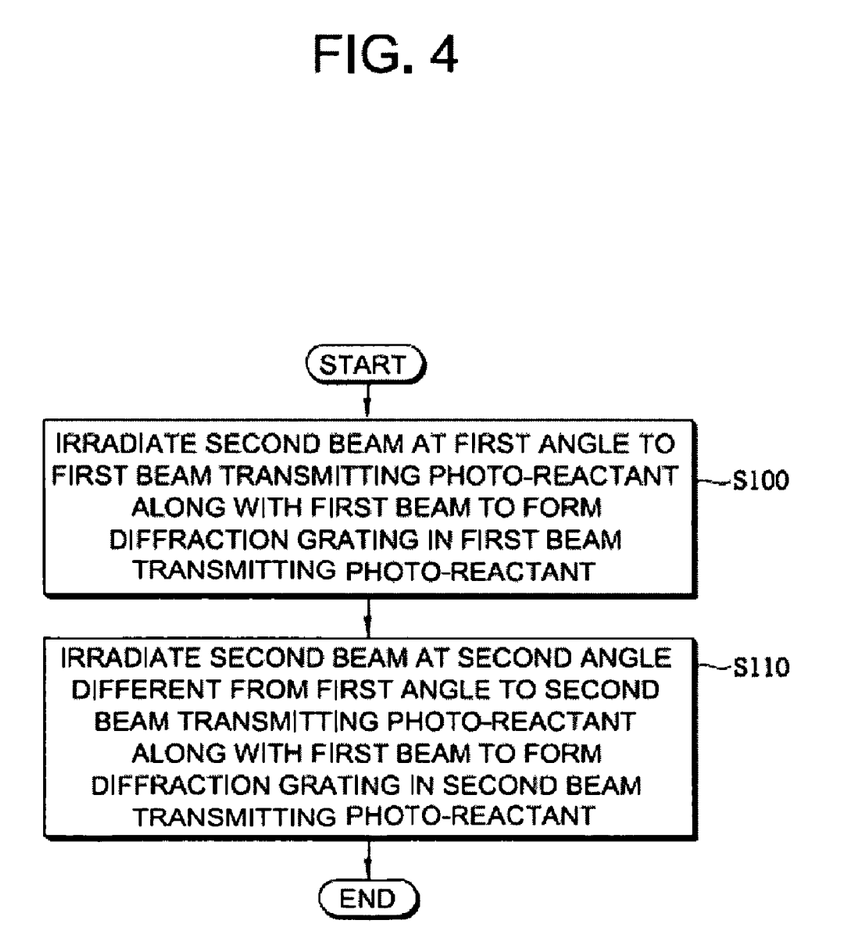
FIG. 4 is a flowchart illustrating a method of manufacturing the optical multiplexer according to the exemplary embodiment of the invention.

FIG. 2 is a partially expanded cross-sectional view illustrating beam transmitting portions of the optical multiplexer according to the exemplary embodiment of the invention and FIG. 4 is a flowchart illustrating a method of manufacturing the optical multiplexer according to the exemplary embodiment of the invention. As shown in FIGS. 2 and 4, the first beam transmitting portion 130a filled with the photo-polymer 132 is located at a beam irradiating position. Then, a spherical-wave beam (first beam) is irradiated to the first beam transmitting portion 130a at a fixed angle. At the same time, a plane-wave beam (second beam) is irradiated thereto at a first angle "θ1." Then, an interference fringe based on the first angle θ1 is formed in the first beam transmitting portion 130a (S100).

Next, the substrate 110 is revolved and thus the second beam transmitting portion 130b is located at the beam irradiating position. A spherical-wave beam having the same fixed angle as the angle of the spherical-wave beam irradiated to the first beam transmitting portion 130a is irradiated to the second beam transmitting portion 130b and a plane-wave beam (second beam) is irradiated thereto at a second angle "θ2." As a result, an interference fringe based on the second angle θ2 is formed in the second beam transmitting portion 130b (S200).

The same process is repeated with variation in angle of the plane-wave beam. Finally, a plane-wave beam is irradiated to the n-th beam transmitting portion 130n at an n-th angle "θn." Then, an interference fringe based on the n-th angle θn is formed in the n-th beam transmitting portion 130n. As a result, the holographic diffraction gratings based on n different angles are formed in the n beam transmitting portions 130. The n angles correspond to the number of in-plane angular multiplexing operations which can be performed at the time of reproducing optical information from an optical information storage medium. The angle "θ" for multiplexing can be selected from the range of angle of 0°<θ<180° and can be determined on the basis of the traveling distance of the plane-wave beam and the area or width of the beam transmitting portion 130. The change in angle of the plane-wave beam can be carried out by a rotating mirror such as a galvano mirror.

As described above, the in-plane angular multiplexing operation is performed by irradiating the spherical-wave beam to the n beam transmitting portions 130 without change in angle. The out-of-plane angular multiplexing operation is performed by irradiating the spherical-wave beam to each beam transmitting portion 130 after moving the corresponding beam transmitting portion 130 to a predetermined angle.

Unlike the above-mentioned exemplary embodiment, the angle of the spherical-wave beam may be changed, not the position of the beam transmitting portions. In this case, diffraction gratings having been subjected to an angular multiplexing process different from that in the above-mentioned exemplary embodiment may be formed. That is, by modifying the type, the wavelength, the phase, the angle, and the like of the irradiated beam for the angular multiplexing process, it is possible to manufacture optical multiplexers capable of performing a variety of angular multiplexing operations. Such modified embodiments cannot depart from the technical scope and spirit of the invention.

The invention is not to the above-mentioned exemplary embodiment, but may be modified in various embodiments. That is, the substrate may be embodied as follows. In the following description, since the material and shape of the beam transmitting portions and the shape and operation of the diffraction gratings formed in the beam transmitting portions are similar to those described in the above-mentioned exemplary embodiment, repeated description thereof will be omitted. For the purpose of convenient and clear understanding, elements are denoted by reference numerals different from those of the above-mentioned exemplary embodiment.

Figure 5:
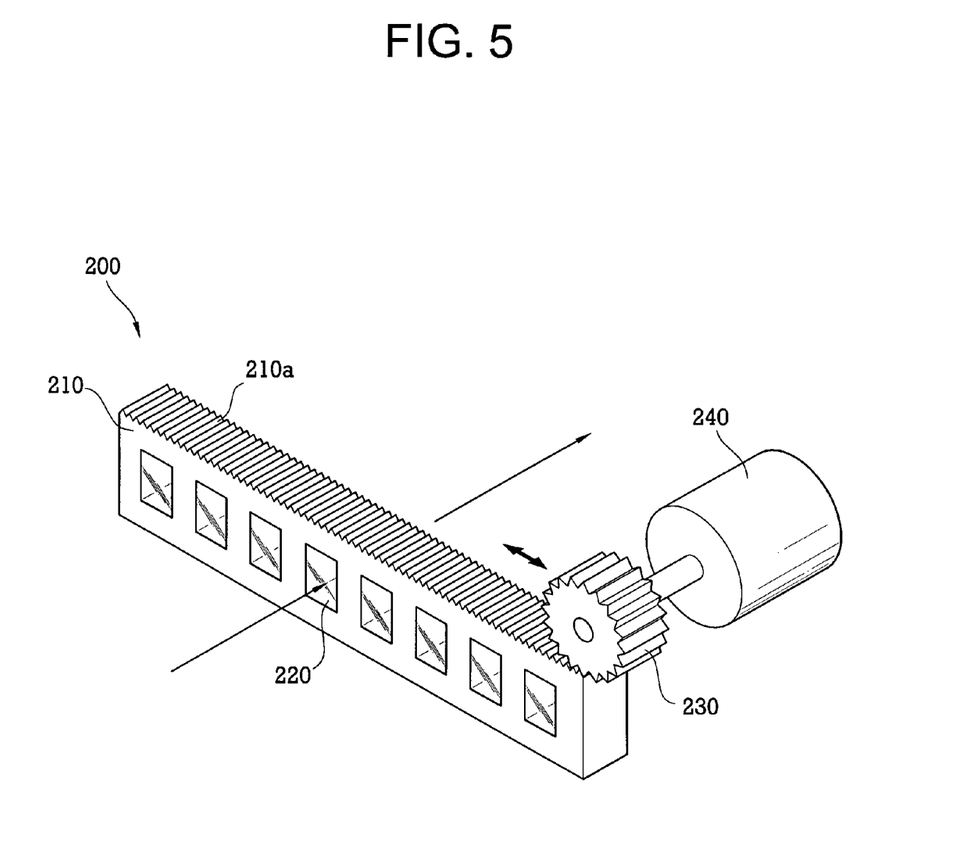
FIG. 5 is a diagram illustrating a configuration and an operating state of an optical multiplexer according to another exemplary embodiment of the invention.

FIG. 5 is a diagram illustrating a configuration and an operating state of an optical multiplexer according to another exemplary embodiment of the invention. In FIG. 5, a substrate 210 of an optical multiplexer 200 has a longitudinal bar shape. A plurality of beam transmitting portions 220 is formed with intervals in the longitudinal direction of the bar.

A rack 210a is formed on the upper portion of the bar-shaped substrate 210. A pinion 230 engages with the rack 210a. The pinion 230 is connected to a forward and backward driving motor 240. Accordingly, the substrate 21o is moved by rotating the forward and backward driving motor 240 forwardly and backwardly. The positions of the beam transmitting portions 220 can be controlled by controlling the forward and backward driving motor 240 in a step manner. The linear movement of the substrate 210 can be guided by a guide member (not shown). A linear driving assembly (not shown) using electromagnetic force can be used to move the substrate 210, or various other techniques may be used.

Figure 6:
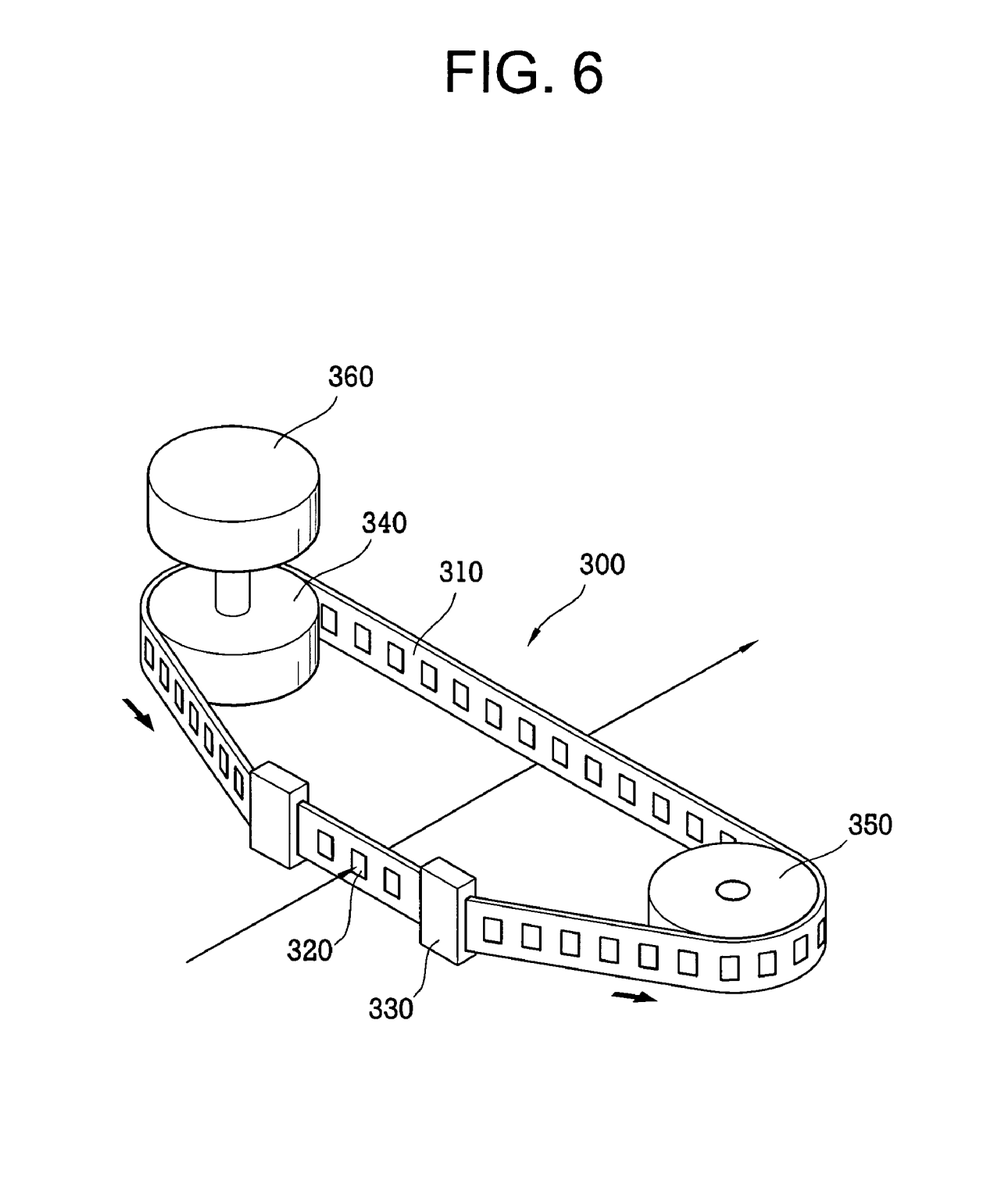
FIG. 6 is a diagram illustrating a configuration and an operating state of an optical multiplexer according to another exemplary embodiment of the invention.

FIG. 6 is a diagram illustrating a configuration and an operating state of an optical multiplexer according to another exemplary embodiment of the invention. In FIG. 6, a substrate 310 of an optical multiplexer 300 has a belt shape. The belt-shaped substrate 310 is wound on two reels 340 and 350. The belt-shaped substrate 310 may be made of a flexible resin material.

A plurality of beam transmitting portions 320 are formed in the traveling direction of the substrate 310 with intervals. A forward and backward driving motor 360 is coupled to one of the two reels 340 and 350. A positioning guide 330 positioning the substrate 310 is disposed at a beam irradiating position. By driving the forward and backward driving motor 360 forwardly and backwardly, the substrate 310 is moved. The positions of the beam transmitting portions 320 can be controlled by controlling the forward and backward driving motor 360 in a step manner.

The optical multiplexers according to the exemplary embodiments of the invention can be used to three-dimensionally record optical information in a holographic data storage and to reproduce the data from the holographic data storage in a multiplexing manner. The optical multiplexers can be applied to a holographic spectrometer by partially modifying the configuration thereof. In addition, the optical multiplexers can be applied to a holographic 3D display by partially modifying the configuration thereof.

Now, an optical information recording apparatus and an optical information reproducing apparatus using the optical multiplexer will be described. In the following embodiments, since configuration and operation of an optical multiplexer can be easily understood with reference to those of the above-mentioned optical multiplexers and the manufacturing method thereof, repeated description thereof is omitted.

Optical Information Recording Apparatus

Figure 7:
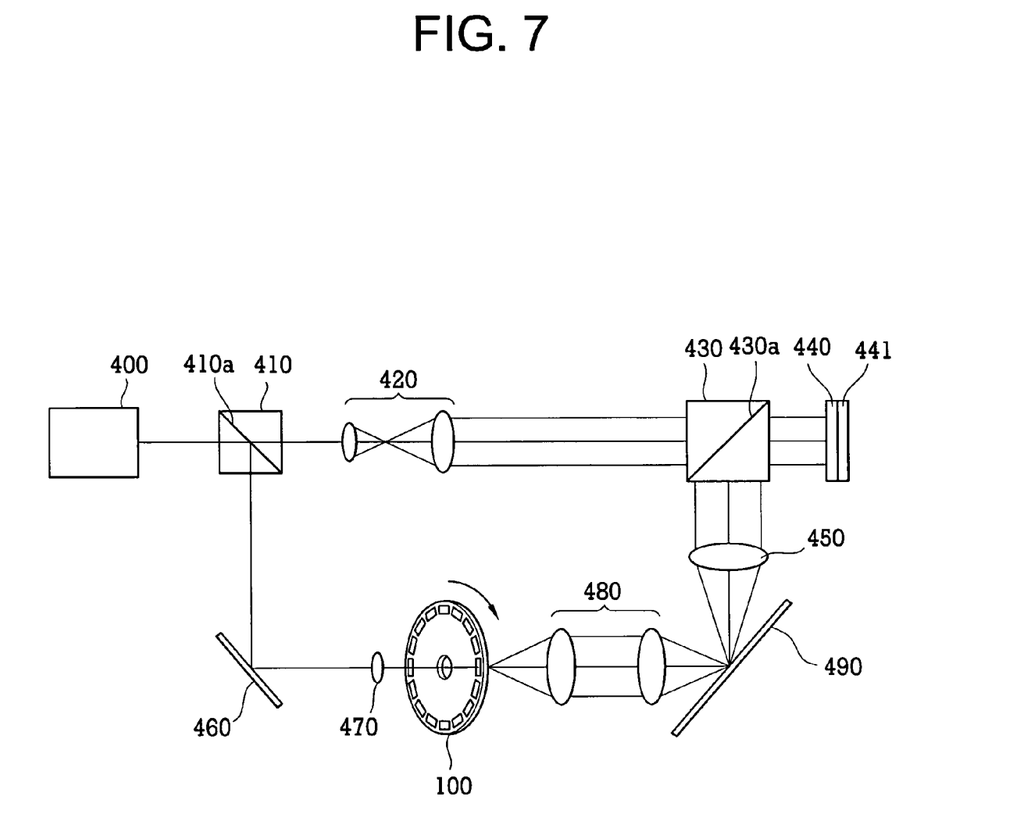
FIG. 7 is a diagram illustrating a configuration of an optical information recording apparatus according to an exemplary embodiment of the invention.

An optical information recording apparatus according to another exemplary embodiment of the invention will be now described. FIG. 7 is a diagram illustrating a configuration of an optical information recording apparatus according to an exemplary embodiment of the invention. The optical information recording apparatus shown in FIG. 7 serves to record optical information, but may serve as an optical information reproducing apparatus by blocking a signal beam. The optical information recording apparatus according to the exemplary embodiment of the invention includes a light source 400. The light source 400 emits a beam with a predetermined wavelength. The beam may be a laser beam having excellent coherence. The optical information recording apparatus further includes a beam splitter 410 for splitting the beam emitted from the light source 400. The beam splitter 410 has a beam splitter surface 410a for splitting a beam to two beams in different directions.

One beam split by the beam splitter 410 travels straightly. Modulated optical information is loaded to the split beam to form a signal beam. Accordingly, the beam is referred to as a signal beam. A shutter (not shown) is disposed in the traveling path of the signal beam so as to control the traveling of the signal beam. Then, by disposing an optical information detector (not shown) in the traveling path of the signal beam, the optical information recording apparatus according to the exemplary embodiment can perform an optical information reproducing function.

A lens system 420 is disposed in the optical path of the signal beam. A polarizing beam splitter 430 for signal beam is disposed next to the lens system 420. The signal beam traveling to the polarizing beam splitter 430 for signal beam is a P polarized beam split by the beam splitter 410. Accordingly, the signal beam passes through the polarizing beam splitter 430 in the traveling direction.

A spatial light modulator 440 is disposed in the optical path of the P polarized beam passing through the polarizing beam splitter 430. The spatial light modulator 440 modulates desired binary data in units of pixels. That is, the spatial light modulator 440 spatially modulates the intensity of the exit beam and optically loads information to the P polarized beam, by switching a transmitting state and a blocking state of a beam by pixels.

Examples of the spatial light modulator 440 can include a thin film transistor liquid crystal display device (TFT LCD) which is a representative active matrix device, a super twisted nematic (STN) LCD which is a passive matrix device, a ferroelectric LCD, a polymer dispersed (PD) LCD, a plasma addressing (PA) LCD, and a digital micro mirror device (DMD).

The signal beam passing through the spatial light modulator 440 becomes a signal beam containing optical information. Then, the spatial light modulator 440 reflects the signal beam in the direction opposite to the incident direction of the signal beam. A reflecting polarizing plate 441 is provided to convert the signal beam, which is a P polarized beam, into an S polarized beam.

The reflected signal beam is incident again on the polarizing beam splitter 430. Since the signal beam is the S polarized beam, the polarizing beam splitter 430 reflects the signal beam by the use of the polarizing beam splitter plane 430a. An objective lens 450 guiding the signal beam reflected by the polarizing beam splitter 430 is disposed in the traveling path of the signal beam. An optical information storage medium 490 is positioned in the traveling path of the signal beam passing through the objective lens 450 in a state in which it is tilted at a predetermined angle.

The optical information storage medium 490 is made of a transparent material. The optical information storage medium 490 may be made of a kind of photo-polymer. Examples of the photo-polymer can include "HRR-660" and "OmniDex-760" (product codes) made by Dupont Co., "ULSH-500" (product code) made by Aprils Co., and polymethylmethacrylate (PMMA). Other kinds of photo-polymers may be used. The optical information storage medium 490 may be formed in a disc shape.

On the other hand, the split beam split in the other direction by the beam splitter 410 polarizing a beam from the light source 400 serves as a reference beam later. The reference beam travels to the optical information storage medium 490 through a reflecting mirror 460 from the beam splitter 410. The reference beam is a plane-wave beam. Accordingly, a wavefront converting lens 470 is provided to convert the reference beam into a spherical-wave beam. The reference beam passing through the wavefront converting lens 470 becomes the spherical-wave beam. Means other than the wavefront converting lens 470 may be used to generate a spherical-wave beam.

The optical multiplexer 100 transmitting the reference beam is disposed in front of the optical information storage medium 490. The optical multiplexer 100 according to the exemplary embodiment of the invention is used as the optical multiplexer. A servo motor (not shown) is disposed to revolve the optical multiplexer 100 at a predetermined control speed. Accordingly, the reference beam is multiplexed at an in-plane angle and an out-of-plane angle by the optical multiplexer 100 and then travels to the optical information storage medium 490.

Figure 8:
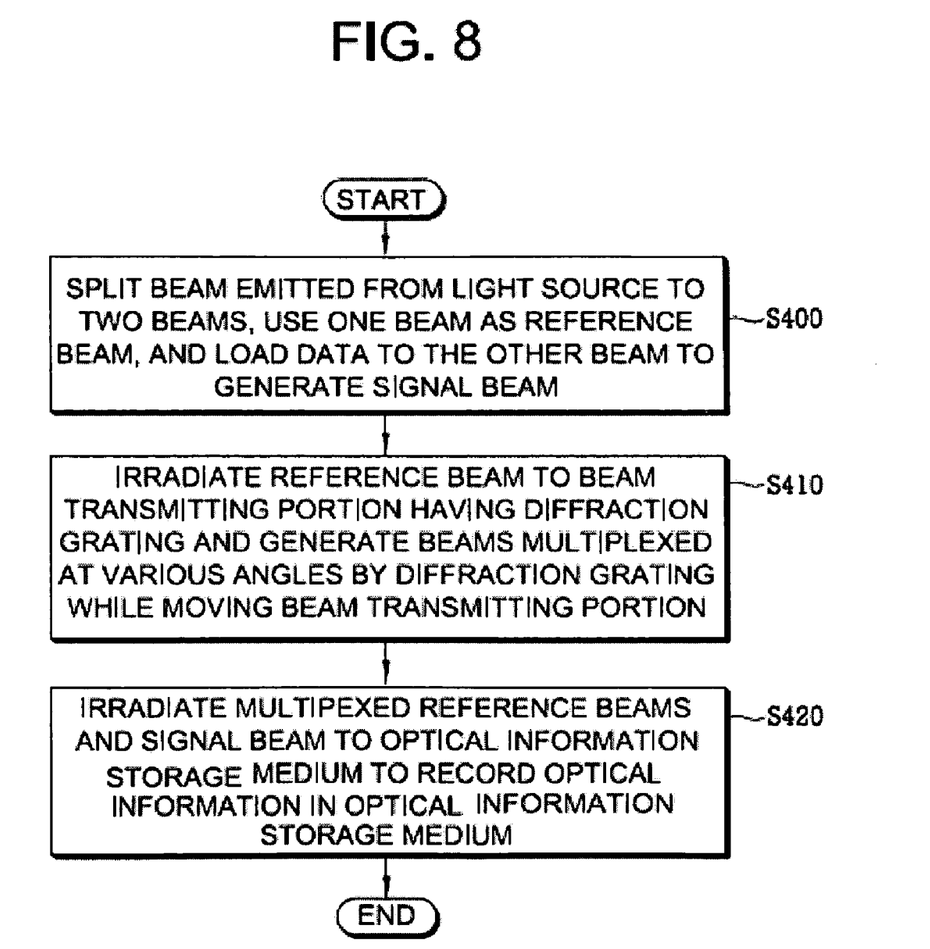
FIG. 8 is a flowchart illustrating an optical information recording method according to an exemplary embodiment of the invention.

Hereinafter, an optical information recording method according to an exemplary embodiment of the invention will be described. FIG. 8 is a flowchart illustrating an optical information recording method according to an exemplary embodiment of the invention.

As shown in FIG. 8, a beam emitted from the light source 400 is split to two beams. One beam is used as the reference beam, and data are loaded to the other beam to generate the signal beam (S400).

The reference beam is allowed to pass through the wavefront converting lens and is converted into a spherical-wave beam. The reference beam converted into the spherical-wave beam is incident on the optical multiplexer 100. At this time, the optical multiplexer 100 is revolved to multiplex the reference beam. Since the optical multiplexing operation is described above, detailed description thereof is omitted. The optical multiplexer 100 multiplexes the reference beam at in-plane angles and out-of-plane angles to generate a plurality of plane-wave beams (S410). The multiplexed reference beams and the signal beam are incident on the optical information storage medium 490. The optical information of the signal beam is multiplexed and recorded in the optical information storage medium 490 by means of interference of the reference beams and the signal beam (S420).

Optical Information Reproducing Apparatus

Figure 9:
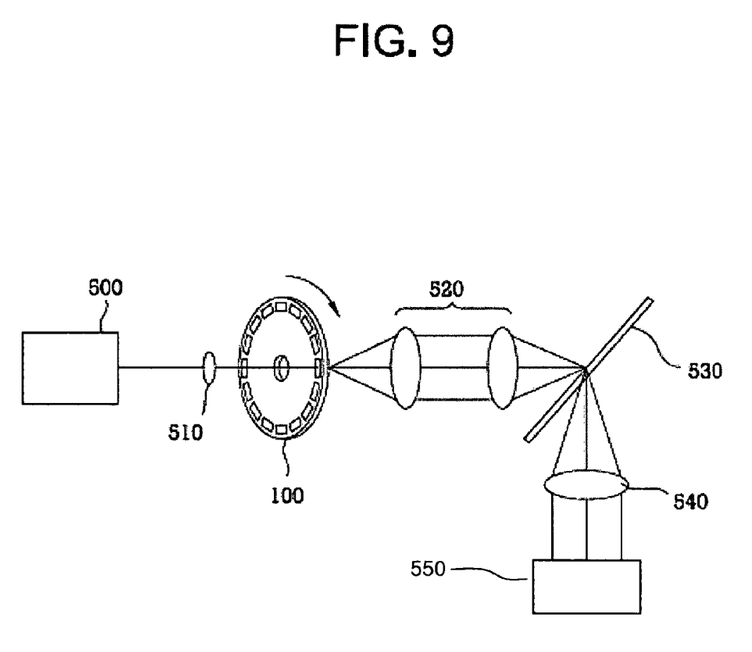
FIG. 9 is a diagram illustrating a configuration of an optical information reproducing apparatus according to an exemplary embodiment of the invention.

FIG. 9 is a diagram illustrating a configuration of an optical information reproducing apparatus according to an exemplary embodiment of the invention. As shown in FIG. 9, the optical information reproducing apparatus according to the exemplary embodiment of the invention includes a light source 500. The light source 500 emits a reference beam with a predetermined wavelength. A wavefront converting lens 510 is provided to convert the beam emitted from the light source 500 into a spherical-wave beam. Means other than the wavefront converting lens 510 may be used to generate the spherical-wave beam. For example, a spherical-wave generator may be provided integrally with a laser oscillator which can be used as a light source.

An optical multiplexer 100 is disposed next to the wavefront converting lens 510 in the traveling path of the reference beam. The optical multiplexers described above may be used as the optical multiplexer 100. The optical multiplexer 100 is connected to a servo motor (not shown) so as to be revolved at a predetermined control speed. Accordingly, the reference beam is multiplexed at an in-plane angle and an out-of-plane angle through the optical multiplexer 100. The beam passing through the optical multiplexer 100 is a spherical-wave beam. A lens system 520 guiding the multiplexed beam to an optical information storage medium is disposed next to the optical multiplexer 100.

The reference beam passing through the lens system 520 is incident on the optical information storage medium 530 storing optical information. Multiplexed optical information is recorded in the optical information storage medium 530. The optical information storage medium 530 is as described in the optical information recording apparatus.

When the reference beam is incident on the optical information storage medium 530, a reproduced beam is emitted from the optical information storage medium 530. An objective lens 540 and an optical information detector 550 are disposed in the traveling path of the reproduced beam. The optical information detector 550 may be a charge-coupled device (CCD), a complementary metal-oxide semiconductor (CMOS), or an optical device capable of detecting a beam. Accordingly, the optical information stored in the optical information storage medium 530 is detected by the optical information detector 530.

Figure 10:
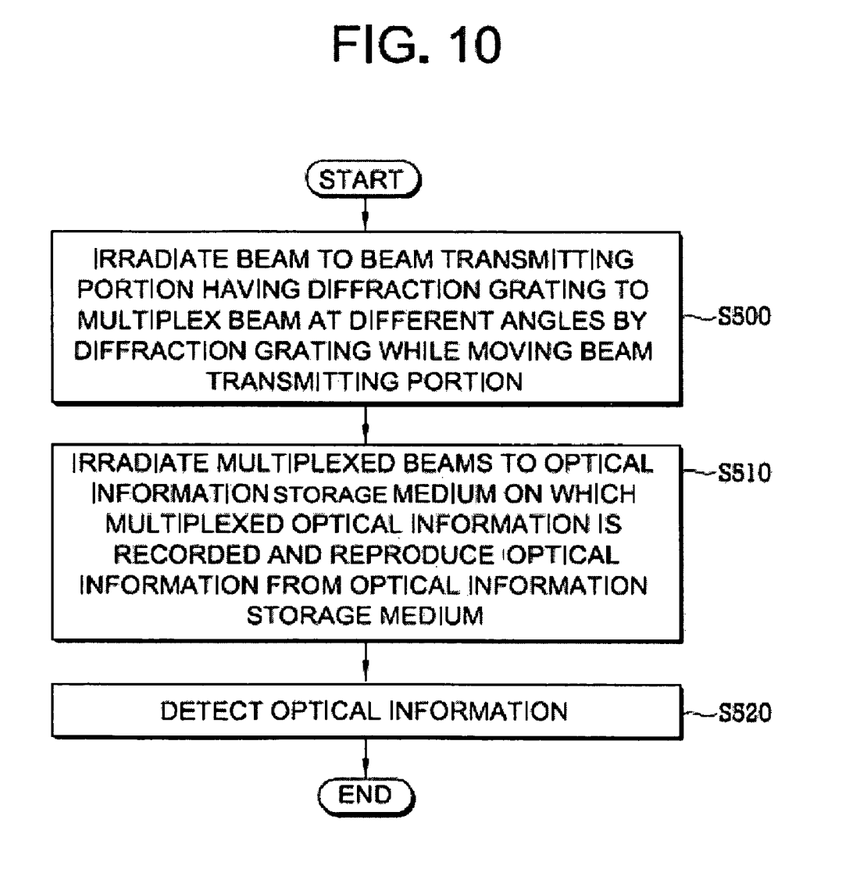
FIG. 10 is a flowchart illustrating an optical information reproducing method according to an exemplary embodiment of the invention.

Hereinafter, an optical information reproducing method according to an exemplary embodiment of the invention will be described. FIG. 10 is a flowchart illustrating an optical information reproducing method according to an exemplary embodiment of the invention.

As shown in FIG. 10, the beam emitted from the light source travels to the optical information storage medium 530. The beam emitted from the light source is a spherical-wave beam. The spherical-wave beam is converted into reference beams multiplexed at in-plane angles and out-of-plane angles through the optical multiplexer 100 (S500).

The beams passing through the optical multiplexer 100 are incident on the optical information storage medium 530 through the lens system 520 (S510). Since the operation of the optical multiplexer 100 has been described above, description thereof is omitted. When the multiplexed reference beam is incident on the optical information storage medium 530, the optical information stored therein is continuously reproduced in a multiplexing manner depending upon the incident angles. The optical information is detected by the detector 550 (S520). The detected optical information is restored to data later.

In the optical multiplexer, the optical information recording apparatus and method, and the optical information reproducing apparatus and method according to the exemplary embodiments of the invention, elements having other functions may be added or some elements may be replaced with other elements. However, if the modified examples include the essential elements of the invention and perform the recording operation and the reproducing operation using the optical multiplexer according to the exemplary embodiments of the invention separately or together, they are all included in the technical scope of the invention.

In the optical multiplexer, the optical information recording apparatus and method, and the optical information reproducing apparatus and method according to the invention, the in-plane and out-of-plane multiplexing and recording operations of optical information are performed using a substrate. Accordingly, since the servo control system for controlling mirrors can be simplified greatly and the configuration of the optical system can be simplified, it is possible to reduce misalignment and manufacturing cost of the optical system and to reduce the total size of the recording apparatus and the reproducing apparatus.

What is claimed is:

1. An optical multiplexer comprising:
   a substrate having a first surface to a second surface; and
   a plurality of beam transmitting portions formed in and extending through holes in the substrate from the first surface to the second surface, each of the plurality of beam transmitting portions having a diffraction grating, said diffraction grating formed by irradiating a spherical wave beam and a plane wave beam respectively to the each of the plurality of beam transmitting portions, wherein each irradiation angle formed by the spherical beam and the plane wave beam onto each of the beam transmitting portions is different, and the diffraction grating diffracts a beam irradiated to the each of the plurality of beam transmitting portions at different angle, and the diffracted beam is multiplexed, wherein the multiplexed beam is incident on an optical information storage medium to record and reproduce data.

2. The optical multiplexer according to claim 1, wherein the diffraction grating is a holographic interference fringe formed in photo-polymer filled in the each of the plurality of beam transmitting portions.

3. The optical multiplexer according to claim 1, wherein the substrate is made of a material that reflects and/or absorbs light.

4. The optical multiplexer according to claim 3, wherein the each of the plurality of beam transmitting portions forms in and extending through each of the hole in the substrate.

5. The optical multiplexer according to claim 1, wherein the substrate has a disc shape and the beam transmitting portions are spaced from each other along the circumference of the substrate.

6. The optical multiplexer according to claim 1, wherein the substrate has a bar shape and the beam transmitting portions are spaced from each other in the longitudinal direction of the substrate.

7. The optical multiplexer according to claim 1, wherein the substrate has a belt shape and the beam transmitting portions are spaced from each other in the traveling direction of the belt.

8. An optical information reproducing apparatus comprising:
- a light source;
- an optical multiplexer including a plurality of beam transmitting portions formed in and extending through holes in a substrate, each of the plurality of beam transmitting portions having a diffraction grating, the diffraction grating formed by irradiating a spherical wave beam having same irradiation angle onto each of the beam transmitting portion and a plane wave beam having different irradiation angle onto each of the plurality of beam transmitting portions, wherein the irradiation angle is determined based on an angle formed by the spherical wave and the plane wave irradiated on the substrate;
- an optical system configured to guide a beam emitted from the light source to the optical multiplexer, wherein the diffraction grating diffracts the beam irradiated to the each of the plurality of beam transmitting portions at a different angle, the diffracted beam is multiplexed, and the optical multiplexer is configured to guide the multiplexed beam to an optical information storage medium which stores multiplexed optical information; and
- an optical information detector configured to detect the multiplexed optical information reproduced from the optical information storage medium by the multiplexed beam.

9. The optical information reproducing apparatus according to claim 8, wherein the substrate revolves for the beam to be irradiated to the each of the plurality of beam transmitting portions.

10. The optical information reproducing apparatus according to claim 9, wherein the beam irradiated to the optical multiplexer is a spherical-wave beam and the multiplexed beam emitted from the optical multiplexer is a plane-wave beam.

11. The optical information reproducing apparatus according to claim 10, wherein the each of the plurality of beam transmitting portion generates the plane-wave beam with a different out-of-plane angle when the substrate is moved at an out-of-plane position.

12. A method for making an optical multiplexer, the method comprising:
- configuring a plurality of transmitting portions formed in and extending through a first hole in a substrate;
- irradiating a first spherical wave beam at a predetermined irradiation angle and a first plane wave beam at different angle from the predetermined irradiation angle respectively to a first beam transmitting portion for forming a first diffraction grating;
- irradiating a second spherical wave beam at the predetermined angle and a second plane wave beam at different from the first irradiation angle of the first plane wave beam to a second beam transmitting portion for forming a second diffraction grating, wherein each of the first diffraction grating and the second diffraction grating diffracts a beam irradiated thereon; and
- irradiating a third spherical wave beam at the predetermined angle and a third plane wave beam at different from the irradiation angle of each of the first and second plane wave beam to a third beam transmitting portion for forming a third diffraction grating;
- wherein each of the first, second and third diffraction grating diffracts a beam irradiated thereon and is multiplexed, wherein the multiplexed beam is incident on an optical information storage medium to record and reproduce data.

13. The method according to claim 12, wherein the second angle and the third angle are different each other, and the each of the first diffraction grating and the second diffraction grating diffracts the beam at a different angle.

14. An optical information recording apparatus comprising:
- a light source;
- a beam splitter configured to split a beam emitted from the light source;
- a signal beam optical system configured to produce a signal beam by loading data to the split beam from the beam splitter;
- an optical multiplexer including a plurality of beam transmitting portions formed in and extending through holes in a substrate having a first surface to a second surface, each of the plurality of beam transmitting portions having a diffraction grating, the diffraction grating formed by irradiating a spherical wave beam having a same irradiation angle and a plane wave beam having a different irradiation angle, irradiated to the each of the plurality of beam transmitting portions, respectively, wherein each of the irradiation angle is determined based on an angle formed by the spherical wave and the plane wave irradiated to the substrate; and
- a reference beam optical system configured to guide the another split beam from the beam splitter as a reference beam to the optical multiplexer, wherein the diffraction grating diffracts the reference beam irradiated to the each of the plurality of beam transmitting portions at a different angle, and the diffracted reference beam is multiplexed, and the optical multiplexer is configured to guide the multiplexed beam to an optical information storage medium.

15. The optical multiplexer according to claim 1, further comprising:
- each of the spherical beam is irradiated onto each of the beam transmitting portions with same irradiation angle one another and each of the plane wave beam is irradiated onto each of the beam transmitting with different irradiation angle one another and the each irradiation angle is determined based on an angle incident onto substrate of each of the beam transmitting portion.

* * * * *

UNITED STATES PATENT AND TRADEMARK OFFICE
CERTIFICATE OF CORRECTION

PATENT NO. : 8,306,376 B2
APPLICATION NO. : 11/486451
DATED : November 6, 2012
INVENTOR(S) : Kun-Yul Kim Page 1 of 1

It is certified that error appears in the above-identified patent and that said Letters Patent is hereby corrected as shown below:

On the Title page, Item (73) Assignee should read: ~~Wi-LAN Inc.~~ MAPLE VISION TECHNOLOGIES INC., Ottawa (CA)

Signed and Sealed this
Twenty-sixth Day of February, 2013

Teresa Stanek Rea
*Acting Director of the United States Patent and Trademark Office*